United States Patent
Warren et al.

(10) Patent No.: US 10,738,645 B2
(45) Date of Patent: Aug. 11, 2020

(54) EMBEDDED TRIAXIAL EPOXY CAP PROBE

(71) Applicant: UNITED TECHNOLOGIES CORPORATION, Farmington, CT (US)

(72) Inventors: Eli Cole Warren, Wethersfield, CT (US); Peter J. Walsh, Wethersfield, CT (US)

(73) Assignee: Raytheon Technologies Corporation, Farmington, CT (US)

(*) Notice: Subject to any disclaimer, the term of this patent is extended or adjusted under 35 U.S.C. 154(b) by 153 days.

(21) Appl. No.: 16/120,036

(22) Filed: Aug. 31, 2018

(65) Prior Publication Data

US 2020/0072076 A1    Mar. 5, 2020

(51) Int. Cl.
| | |
|---|---|
| *F01D 21/00* | (2006.01) |
| *F01D 11/12* | (2006.01) |
| *F04D 29/52* | (2006.01) |
| *G01B 7/14* | (2006.01) |

(52) U.S. Cl.
CPC ............ *F01D 21/003* (2013.01); *F01D 11/12* (2013.01); *F04D 29/526* (2013.01); *G01B 7/14* (2013.01); *F05D 2220/323* (2013.01); *F05D 2240/14* (2013.01); *F05D 2270/821* (2013.01)

(58) Field of Classification Search
CPC ........ F01D 21/003; F01D 11/08; F01D 11/12; F01D 11/14; F01D 11/20; F04D 29/321; F04D 29/325; F04D 29/526; G01B 7/14
See application file for complete search history.

(56) References Cited

U.S. PATENT DOCUMENTS

| | | | | |
|---|---|---|---|---|
| 4,804,905 | A | * | 2/1989 | Ding ...................... F01D 21/04 174/152 GM |
| 5,973,502 | A | * | 10/1999 | Bailleul .................. G01B 7/14 324/662 |
| 9,279,336 | B2 | | 3/2016 | Warren |
| 9,316,479 | B2 | | 4/2016 | Warren et al. |
| 10,330,455 | B2 | * | 6/2019 | Rice ....................... F01D 25/24 |
| 10,352,738 | B2 | * | 7/2019 | Elliot ..................... G01D 11/24 |
| 10,371,497 | B2 | * | 8/2019 | Warren ................... F01D 11/14 |
| 10,429,168 | B2 | * | 10/2019 | Warren ................... F01D 17/06 |
| 10,436,612 | B2 | * | 10/2019 | Ford ...................... G01M 15/14 |
| 10,557,373 | B2 | * | 2/2020 | Warren ................... G01H 1/006 |
| 10,641,595 | B2 | * | 5/2020 | Warren .................... F02K 3/06 |
| 2011/0006791 | A1 | * | 1/2011 | Schneider ............... G01B 7/14 324/690 |

(Continued)

*Primary Examiner* — Nathaniel E Wiehe
*Assistant Examiner* — Ryan C Clark
(74) *Attorney, Agent, or Firm* — Snell & Wilmer L.L.P.

(57) ABSTRACT

A triaxial epoxy cap probe may comprise a probe body having a cavity disposed radially outward of a fan blade and comprising a first material, an outer insulator and an inner insulator disposed within the cavity and comprising a second material, a sensor element disposed within the inner insulator, a guard annulus about the sensor element and between the inner insulator and the outer insulator, a ground plane annulus about the outer insulator, wherein the sensor element, the guard annulus, and the ground plane annulus comprise a third material, and a triaxial lead in electronic communication with the sensor element, the guard annulus, and the ground plane annulus, wherein the second material and the third material are at least one of a resin, epoxy, or thermoset material.

20 Claims, 10 Drawing Sheets

(56) References Cited

U.S. PATENT DOCUMENTS

2016/0195411 A1* 7/2016 Ford ................... F04D 29/321
                                                      415/118
2018/0080753 A1   3/2018 Rice et al.
2018/0238673 A1* 8/2018 Warren ................. G01B 7/14

* cited by examiner

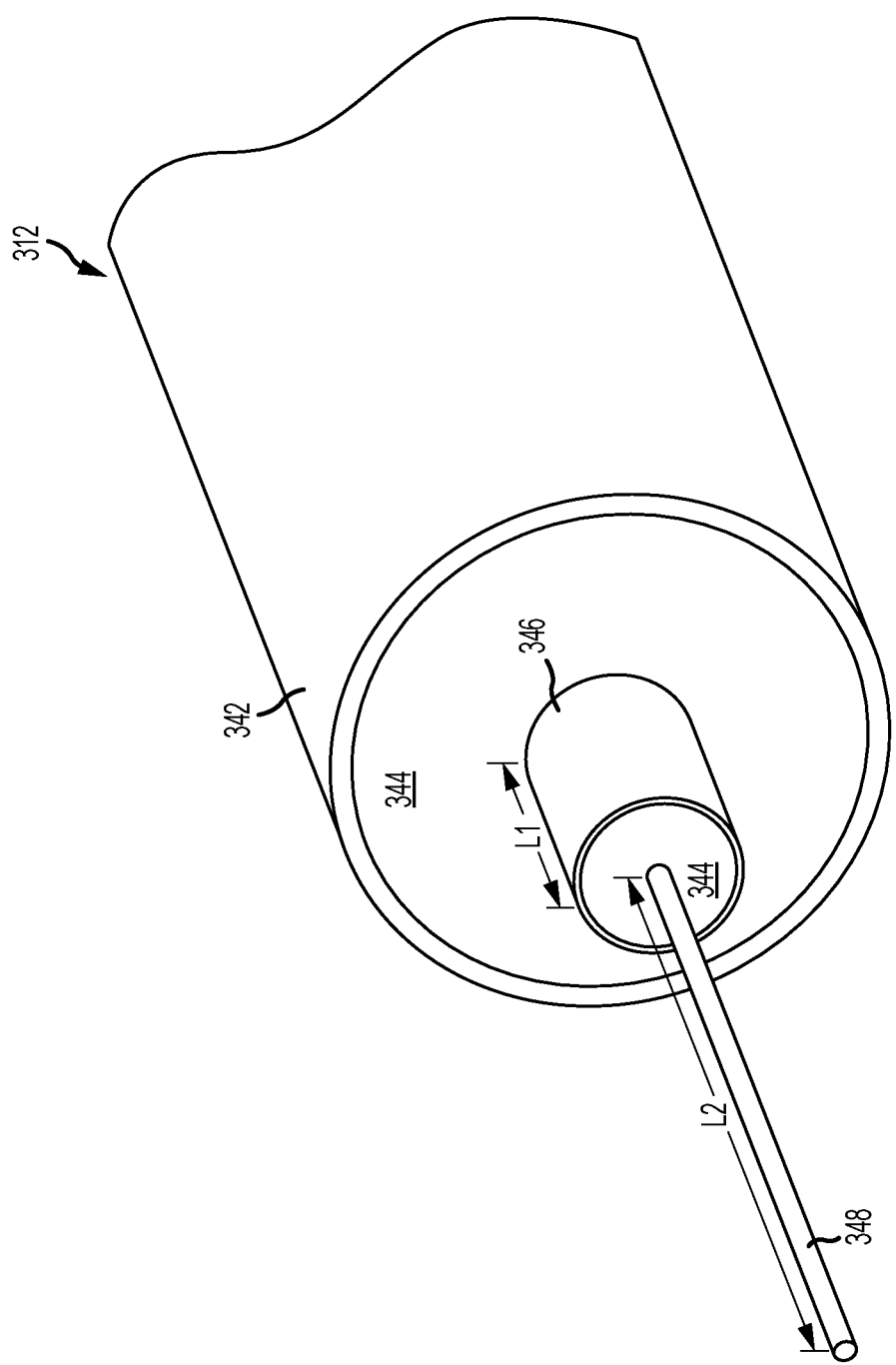

EMBEDDED TRIAXIAL EPOXY CAP PROBE

FIELD

The disclosure relates generally to fan blade tip clearance (BTC) sensors and fan cases in gas turbine engines.

BACKGROUND

Gas turbine engine efficiency is directly related to the level of control of the gap between the blade tip and the outer air seal. In various embodiments, a capacitance-based BTC probe (cap probe) may be placed in the outer air seal to monitor this gap. Traditional cap probes and cap probe installations tend to alter engine structures comprising the outer air seal, tending thereby to alter the air seal and tending to reduce engine efficiency.

SUMMARY

In various embodiments the present disclosure provides a triaxial epoxy cap probe comprising a probe body having a cavity disposed radially outward of a fan blade and comprising a first material, an outer insulator and an inner insulator disposed within the cavity and comprising a second material, a sensor element disposed within the inner insulator, a guard annulus about the sensor element and between the inner insulator and the outer insulator, a ground plane annulus about the outer insulator, wherein the sensor element, the guard annulus, and the ground plane annulus comprise a third material, and a triaxial lead in electronic communication with the sensor element, the guard annulus, and the ground plane annulus, wherein the second material and the third material are at least one of a resin, epoxy, or thermoset material.

In various embodiments, the first material comprises at least one of a composite, a resin, epoxy, or thermoset material. In various embodiments, the second material comprises at least one of a hydrophobic dielectric resin, epoxy, or thermoset material comprising bisphenol AF diglycidyl ether having fluorinated methyl groups. In various embodiments, the third material comprises at least one of a hydrophobic conductive resin, epoxy, or thermoset material comprising bisphenol AF diglycidyl ether having fluorinated methyl groups. In various embodiments, the probe body comprises a passage wherein the triaxial lead is disposed within the passage. In various embodiments, the sensor element, the inner insulator, the guard annulus, the outer insulator, and the ground plane annulus comprise a sensor puck. In various embodiments, the sensor puck comprises a first half, wherein the first half comprises, a first backplane, a second backplane, and a first mating surface. In various embodiments, the first backplane comprises a first annular wall and the second backplane comprises a second annular wall. In various embodiments, the sensor puck comprises a second half coupled to the first half at the first mating surface, wherein the first mating surface comprises a plurality of V-shaped grooves. In various embodiments, a cap of the second material is disposed within the cavity over the sensor puck.

In various embodiments, the present disclosure provides a gas turbine engine comprising a compressor section configured to compress a gas, a combustor section aft of the compressor section and configured to combust the gas, and a fan section comprising, a fan having a blade having a tip, a fan case having an inner aerodynamic surface and a rub strip, the blade proximate the inner aerodynamic surface, and a triaxial epoxy cap probe comprising a probe body having a cavity disposed radially outward of a fan blade and comprising a first material, an outer insulator and an inner insulator disposed within the cavity and comprising a second material, a sensor element disposed within the inner insulator, a guard annulus about the sensor element and between the inner insulator and the outer insulator, a ground plane annulus about the outer insulator, wherein the sensor element, the guard annulus, and the ground plane annulus comprise a third material, and a triaxial lead in electronic communication with the sensor element, the guard annulus, and the ground plane annulus, wherein the second material and the third material are at least one of a resin, epoxy, or thermoset material.

In various embodiments, the first material comprises at least one of a composite, a resin, epoxy, or thermoset material, the second material comprises at least one of a hydrophobic dielectric resin, epoxy, or thermoset material comprising bisphenol AF diglycidyl ether having fluorinated methyl groups, and the third material comprises at least one of a hydrophobic conductive resin, epoxy, or thermoset material comprising bisphenol AF diglycidyl ether having fluorinated methyl groups. In various embodiments, the probe body comprises a passage wherein the triaxial lead is disposed within the passage. In various embodiments, the sensor element, the inner insulator, the guard annulus, the outer insulator, and the ground plane annulus comprise a sensor puck. In various embodiments, the sensor puck comprises a first half, wherein the first half comprises, a first backplane, a second backplane, and a first mating surface. In various embodiments, the first backplane comprises a first annular wall and the second backplane comprises a second annular wall. In various embodiments, the sensor puck comprises a second half coupled to the first half at the first mating surface, wherein the first mating surface comprises a plurality of V-shaped grooves. In various embodiments, a cap of the second material is disposed within the cavity over the sensor puck. In various embodiments, the first material, the second material, and the third material comprise a monolithic structure.

In various embodiments, the present disclosure provides a method of manufacturing a triaxial epoxy cap probe comprising forming a first half and a second half of a sensor puck. The method includes coupling a triaxial lead to the first half of the sensor puck, wherein a lead wire is in electronic communication with a sensor element, a driven guard is in electronic communication with a guard annulus, and an outer shield is in electronic communication with a ground plane annulus. The method includes coupling the second half of the sensor puck to the first half of the sensor puck, inserting the sensor puck into a cavity of a probe body, and filling a remainder of the cavity with an insulator material.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when con

FIG. 3B illustrates a triaxial lead, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
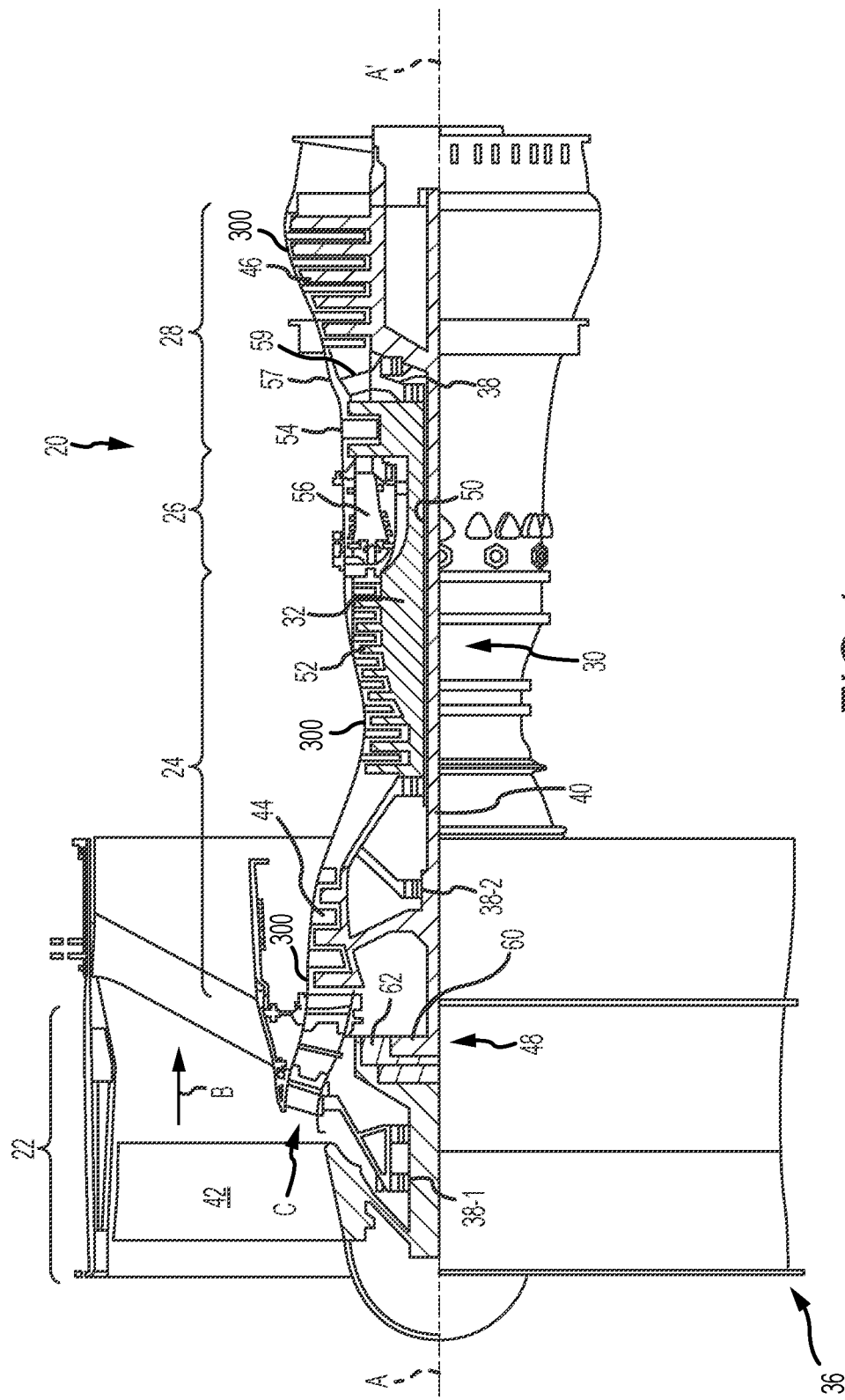
- FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art including single spool and three-spool architectures.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2:
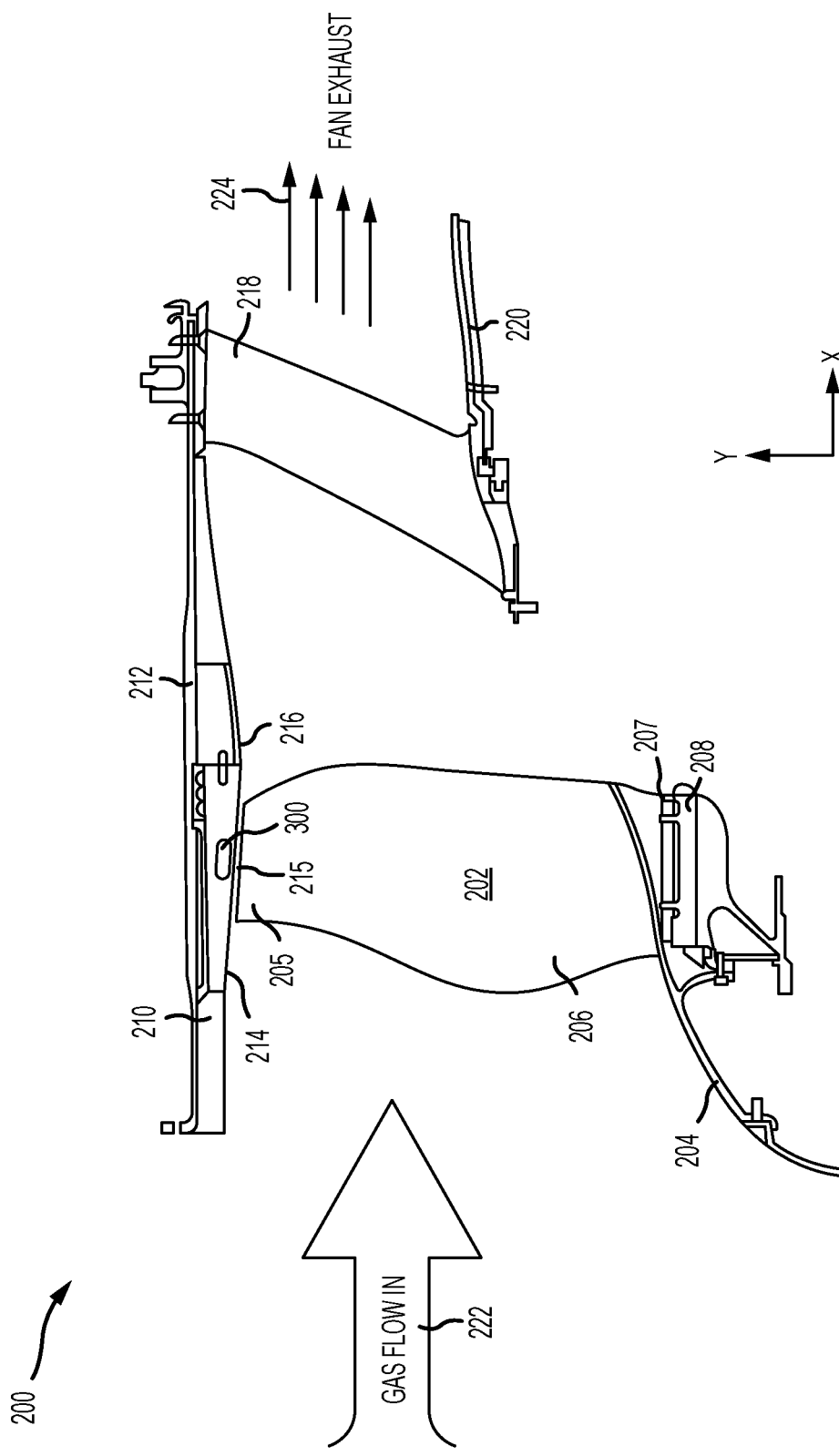
FIG. 2 illustrates a fan section having a triaxial epoxy cap probe, in accordance with various embodiments.

According to various embodiments and with reference to FIGS. 1 and 2, a fan section 200 having a triaxial epoxy cap probe, is provided. Fan 202 comprises blade 206 coupled at blade root 207 to a fan disk 208 and compressor inlet cone 204. Fan 202 may be coupled to a shaft, such as inner shaft 40, where inner shaft 40 may be in mechanical communication with geared architecture 48. Tip 205 of blade 206 lies proximate rub strip 214 which forms a part of the inner aerodynamic surface 216 of fan case 210. A triaxial epoxy cap probe 300 lies radially outward of blade 206 and proximate tip 205 between inner aerodynamic surface 216 and outer casing 212 of fan case 210. Triaxial epoxy cap probe 300 comprises a structural element of rub strip 214 and may be co-molded in part with rub strip 214 or may be embedded within rub strip 214. For example, a triaxial epoxy cap probe may be assembled in a core of rub strip material and the core inserted into the rub strip or may be assembled within a cavity formed the rub strip. In various embodiments, triaxial epoxy cap probe 300 may form a portion of inner aerodynamic surface 216. Fan case 210 may be coupled at an aft end to pylon 218 which may be coupled to compressor casing 220. As fan 202 rotates about the shaft it tends to draw in gas 222, such as, for example air, at the fore end of fan case 210. Rotating fan 202 tends to accelerate gas 222 along inner aerodynamic surface 216 toward pylon 218 passing between inner aerodynamic surface 216 and compressor case 220 as fan exhaust 224.

In various embodiments, portion of gas 222 may escape fan 202 by passing over tip 205 through a gap 215 between tip 205 and inner aerodynamic surface 216 tending to decrease efficiency. In various embodiments, the width of gap 215 between tip 205 and inner aerodynamic surface 216 may vary with respect to a position along the chord line of blade 206. The triaxial epoxy cap probe 300 may be located axially (relative to the axis of rotation of fan 202, with momentary reference to A-A' in FIG. 1) within a bounded portion of rub strip 214 bounded at the forward end by a leading edge of blade 206 and at the aft end by a trailing edge of blade 206. In various embodiments, a plurality of triaxial epoxy cap probe sensors may be located axially within the bounded portion of rub strip 214 along the chord of blade 206. In various embodiments, a plurality of triaxial epoxy cap probe sensors may be located circumferentially around fan section 200 within the bounded portion of rub strip 214.

Figure 3A:
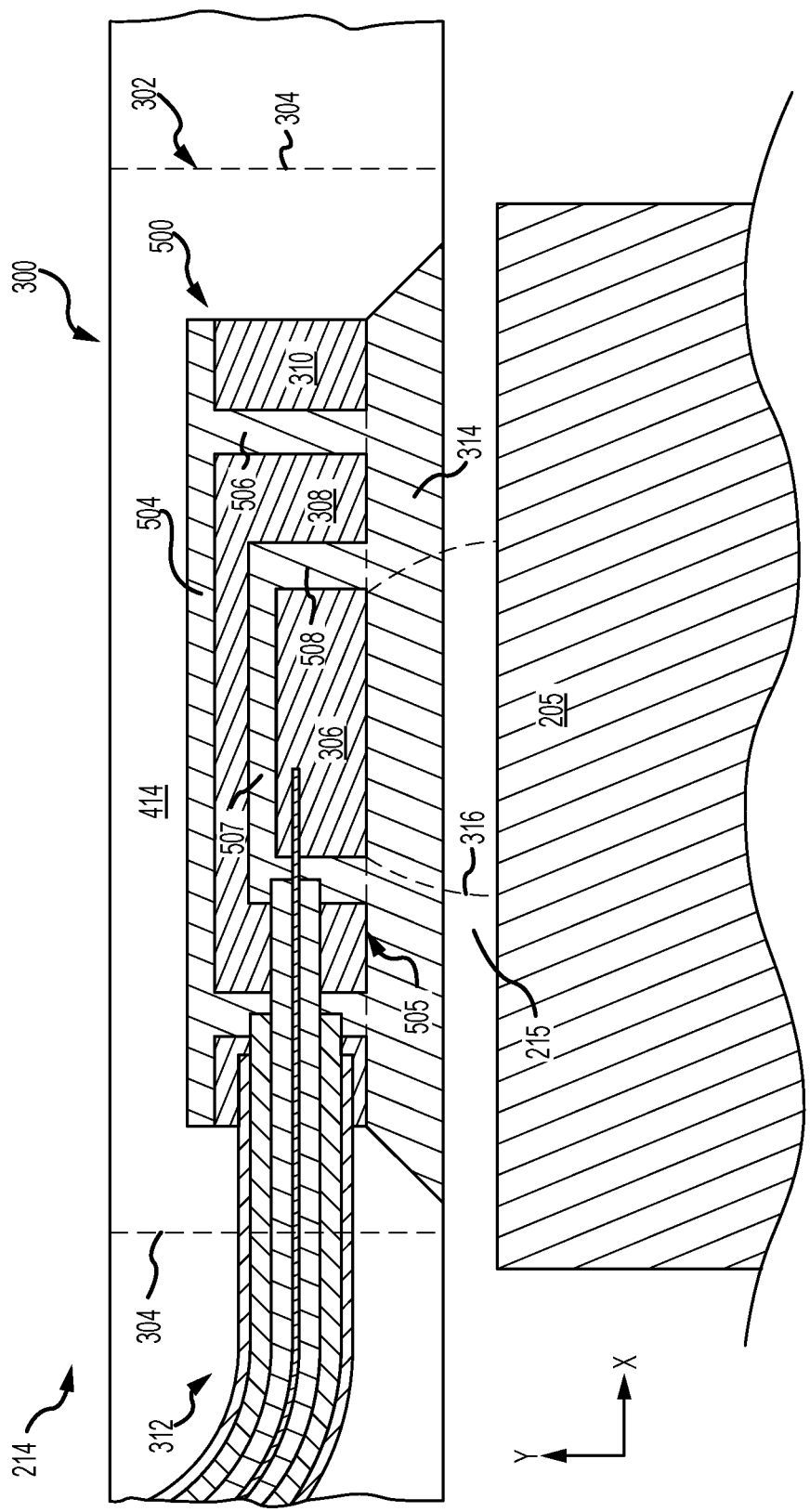
FIG. 3A illustrates a cross section of a triaxial epoxy cap probe, in accordance with various embodiments.

With additional reference to FIG. 3A and 3B, a triaxial epoxy cap probe 300 is provided in cross section and comprises a probe body 302 and a triaxial lead 312. In various embodiments, body 302 may comprise body material 414 and a portion of rub strip 214. With brief additional reference to FIG. 4B, in various embodiments a body 302 (302' of FIG. 4B) may comprise a full thickness core of body material 414 taken from a rub strip such as rub strip 214 as described within core boundary 304. Stated another way, a body 302 may comprise a plug of body material 414 inserted into a hole bored entirely through a rub strip. The triaxial lead 312 may be embedded in and/or inserted through body 302 into sensor puck 500 and is in electronic communication with sensor element 306, guard annulus 308, and ground plane annulus 310 of sensor puck 500.

In various embodiments, and with brief reference to FIG. 3B, triaxial lead 312 may be a driven guard lead and comprise a lead wire 348 surrounded by a driven guard 346 containing a first layer of insulating material 344 therein. Driven guard 346 is surrounded by a second layer of insulating material 344 contained within an outer shield 342 such as, for example, a metallic tube or braided metallic wrapping such as one of a steel, a stainless steel, an alloy, and/or an aluminum. In various embodiments, a length L1 of driven guard 346 and a length L2 of lead wire 348 are exposed for assembly. Lead wire 348 is coupled to and is in electronic communication with sensor element 306. The outer shield 342 is coupled to and in electronic communication with ground plane annulus 310. The driven guard 346 is be coupled to and in electronic communication with the guard annulus 308. In various embodiments, a triaxial lead such as triaxial lead 312 may have a diameter about 0.125 in. (3.175 mm) where about in this context means +/−0.015 in. (0.381 mm). In various embodiments, a driven guard and/or an outer shield may comprise a conducive metallic foil, metallic overbraid, metallic tube or any other shield known to those skilled in the art, such as, for example, one of an alloy, a steel, a stainless steel, a copper, an aluminum, or a gold, about the respective layer of insulating material. In various embodiments, the outer shield may be coupled to and in electronic communication with an electrical ground. In various embodiments, ground plane annulus 310, guard annulus 308, and sensor element 306 are protected by cap 314 across sensor puck 500 which may form a portion of inner aerodynamic surface 216.

In various embodiments, sensor element 306 is energized by lead wire 348 and an electric field flows between sensor element 306 and ground plane annulus 310. As tip 205 of blade 206 passes proximate to sensor element 306, electric field 316 tends to flow across gap 215 into blade tip 205 inducing a capacitance between the blade tip 205 and the sensor element 306 which tends to vary with respect to the width of gap 215. In this regard, the gap between a blade tip and an outer aerodynamic surface may be determined as a function of the change in capacitance occurring at a frequency which is a function of the time the blade tip dwells within the electric field.

Figure 4A:
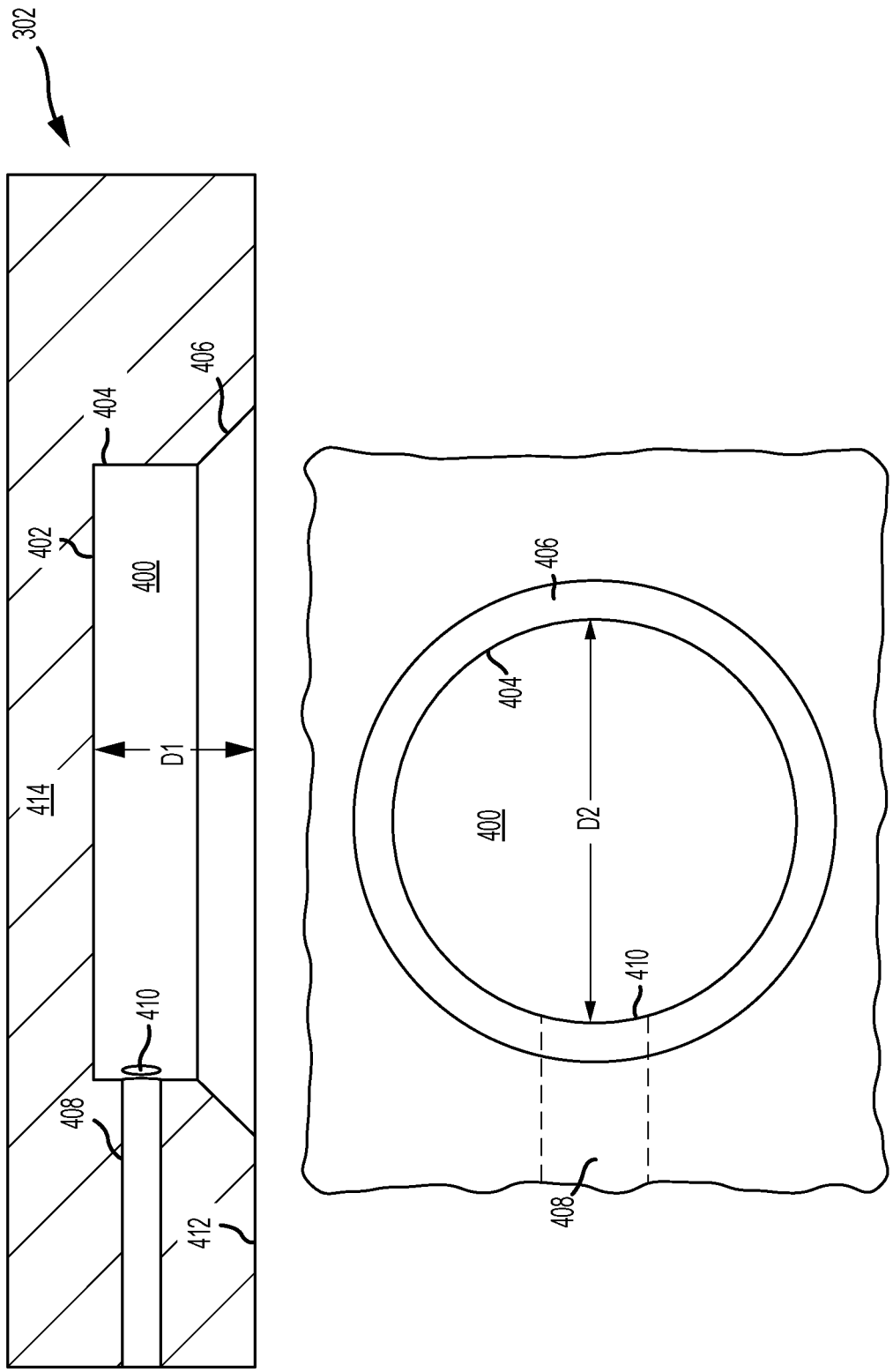
FIG. 4A illustrates a body of a triaxial epoxy cap probe, in accordance with various embodiments.
Figure 4B:
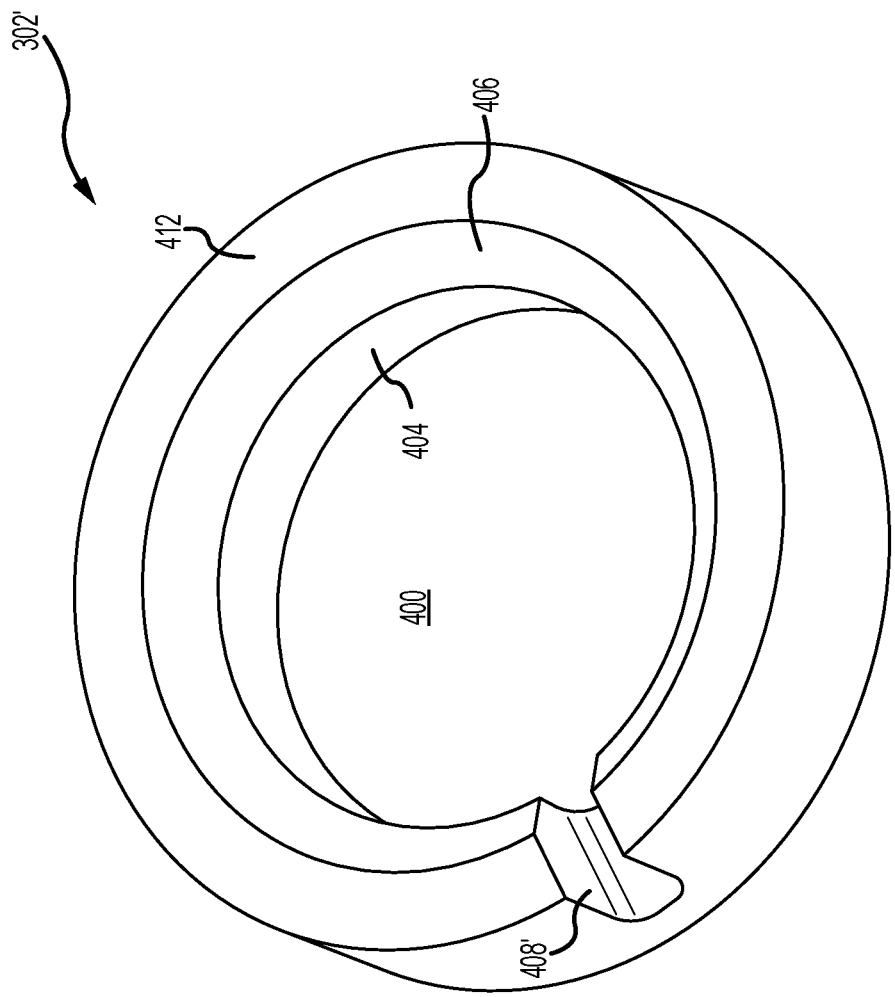
FIG. 4B illustrates a body of a triaxial epoxy cap probe, in accordance with various embodiments.

In various embodiments and with additional reference to FIGS. 4A and 4B, body 302 of triaxial epoxy cap probe 300 is shown in cross-section and in plane with the page looking into a cavity 400 and in FIG. 4B (body 302') as a core plug of body material 414. In various embodiments, body 302 comprises cavity 400 having a depth D1 extending from first surface 412 into body material 414 toward floor 402. In various embodiments, first surface 412 may be coplanar with inner aerodynamic surface 216 and D1 may thereby extend radially outward of inner aerodynamic surface 216. In various embodiments, cavity 400 may be bounded by a sidewall 404 and comprise a chamfer 406 and/or a fillet feature. In various embodiments, cavity 400 may have a diameter D2 and/or width between portions of sidewall 404. In various embodiments, body 302 may comprise passage 408 through body material 414 having an opening 410 into cavity 400 which may be sized to provide ingress for triaxial lead 312. In various embodiments passage 408 may comprise a trench or slot 408' which may be cut a depth into body material 414 from first surface 412 or may be co-molded with body material 414. In various embodiments opening 410 may be located through chamfer 406, or sidewall 404, or floor 402, or any other location suitable for an ingress of a triaxial lead.

In various embodiments, body material 414 may comprise one of a first resin, epoxy, and/or thermoset material and may be interspersed with a fibrous component. Body material 414 may comprise of a material of the rub strip 214. In various embodiments, cavity 400 may be formed additively or subtractively or co-molded with body material 414 and may comprise at least one of a circular geometry, a radial geometry, a multi radial or elliptical geometry, or an angular geometry.

Figure 5A:
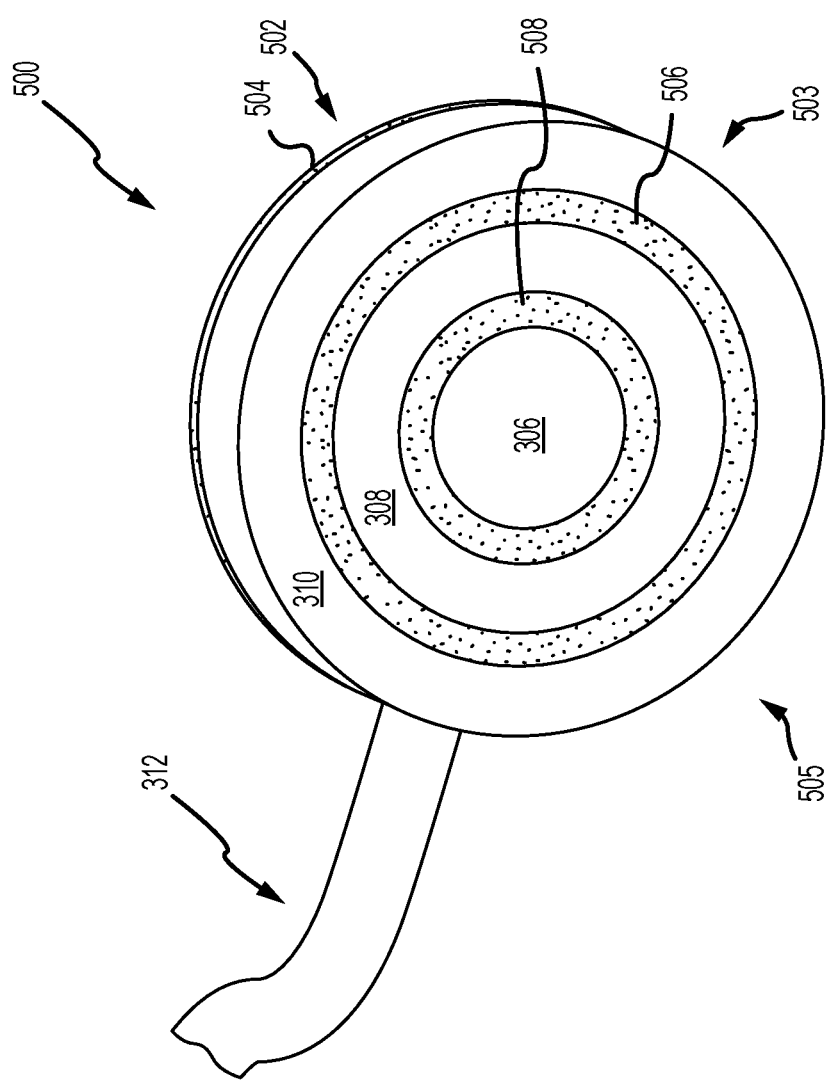
FIG. 5A illustrates a sensor puck of a triaxial epoxy cap probe, in accordance with various embodiments.

With reference now to FIGS. 3A and 5A sensor puck 500 is shown coupled to triaxial lead 312. Sensor puck 500 extends between a first backplane 504 and a sensor face 505. An outer insulator 506 comprises a first backplane 504 including a first annular wall extending perpendicular to first backplane 504 toward sensor face 505 and may thereby divide guard annulus 308 from ground plane annulus 310. An inner insulator 508 comprises a second backplane 507 parallel to first backplane 504 and having a second annular wall extending perpendicular to and circumferentially about the second backplane 507 toward sensor face 505. In this regard, the inner insulator 508 divides the sensor element 306 from the guard annulus 308. In various embodiments, a backplane may comprise a disk structure. In various embodiments, the sensor puck 500 may comprise a first half 502 including the first backplane 504 and a second half 503 including sensor face 505 which may be fitted together sandwiching triaxial lead 312 therebetween.

Figure 5B:
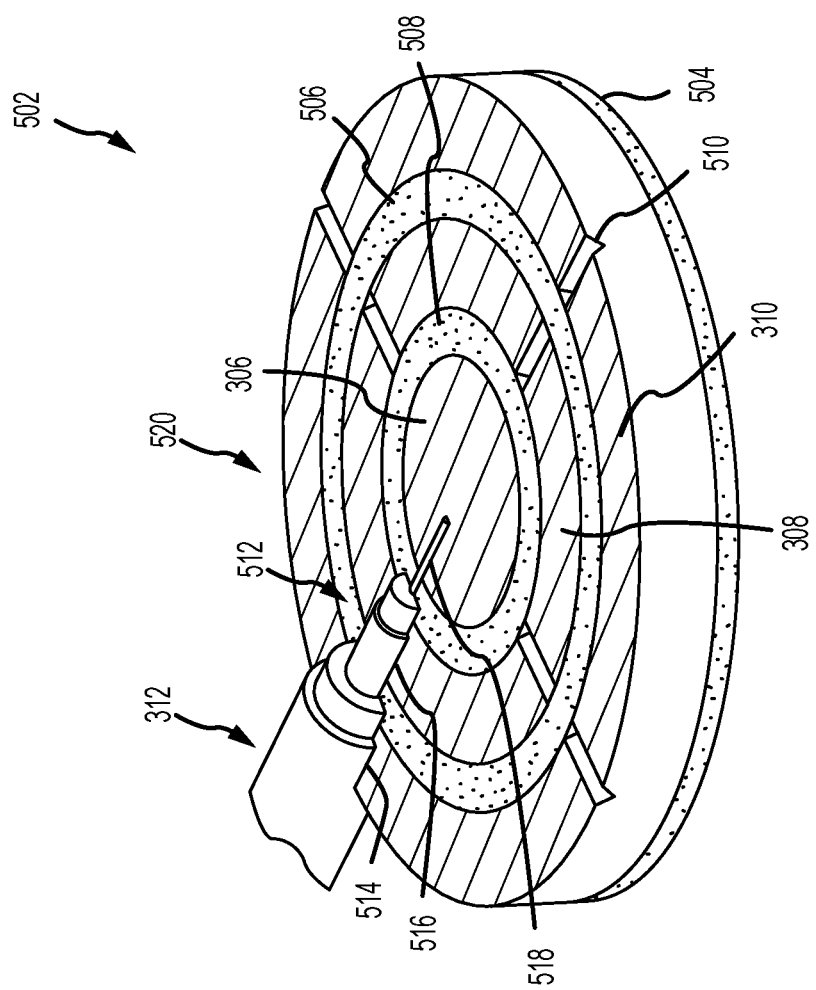
FIG. 5B illustrates a sensor puck of a triaxial epoxy cap probe, in accordance with various embodiments.

With additional reference to FIG. 5B the first half 502 of sensor puck 500 is shown with second half 503 removed. First half 502 comprises first backplane 504 including a portion of the first annular wall of outer insulator 506 and second backplane 507 including a portion of the second annular wall of inner insulator 508. First half 502 includes a first cutout 512 in first mating surface 520 having a first channel 514, a second channel 516, and a third channel 518. First channel 514 extends into ground plane annulus 310 and outer insulator 506 and is sized to enclose the outer shield 342. Second channel 516 extends over the distance L1 into the outer insulator 506 and guard annulus 308 and is sized to enclose the driven guard 346. Third channel 518 extends the distance L2 into the inner insulator 508 and the sensor element 306 and is sized to enclose the lead wire 348. The second half 503 comprises a corresponding second cutout into a second mating face including corresponding channels and, in this regard, outer shield 342, driven guard 346, and lead wire 348 of triaxial lead 312 may be enclosed within the sensor puck 500 when the first half 502 and the second half 503 are fitted together.

In various embodiments, the first half 502 may include a plurality of V-shaped grooves 510 disposed on first mating surface 520 about ground plane annulus 310 and the guard annulus 308. In various embodiments, V-shaped grooves 510 may extend radially with respect to the plane of the first mating surface 520 (e.g., as shown in FIG. 5B) or may extend circumferentially about the mating surface. The V-shaped grooves 510 may be aligned with corresponding V-shaped teeth protruding from a second mating surface and, in this regard, the clocking of the first half 502 to the second half 503 with respect to the first cutout 512 and the second cutout may be established to promote ease of assembly and to fix the triaxial lead 312 within the sensor puck 500. Conductive epoxy may be applied within any of the V-shaped grooves 510, first channel 514, second channel 516, and/or third channel 518 of first half 502 prior to mating with second half 503. In various embodiments, V-shaped grooves 510 of first half 502 may have a greater angular width than the corresponding V-shaped teeth of second half 503 tending thereby to permit excess conductive epoxy to flow into the V-shaped groove in response to compression for curing. In various embodiments, the V-shaped teeth may be relatively taller than the corresponding depth of the V-shaped grooves 510 tending thereby to permit excess conductive epoxy to flow from the V-shaped grooves 510 into a gap between the first mating surface 510 and the corresponding second mating surface. In this regard, the configuration of the V-shaped grooves (i.e., relatively shallow and wide) with respect to the V-shaped teeth (i.e., relatively narrow and tall) may tend to promote epoxy bonding and electrical contact between conductive portions of the first half 502 and the second half 503.

In various embodiments and in like regard, V-shaped grooves 510 may be disposed on first mating surface 520 about the outer insulator 506 and the inner insulator 508 and an dielectric epoxy may be applied within the V-shaped groove. In various embodiments, any number of V-shaped grooves and/or V-shaped teeth may be disposed on the first mating surface 520 and the second mating surface and may alternate therebetween to promote bonding and clocking of the first half 502 to the second half 503.

In various embodiments, the outer insulator 506 and/or the inner insulator 508 may comprise at least one of a second resin, epoxy, and/or thermoset material and may be hydrophobic and have dielectric properties (i.e., the insulator material). In various embodiments, the insulator material may have mechanical properties such as, for example, strength, viscosity, thermal endurance, hardness, abrasion resistance, and density, substantially similar to body material 414. In various embodiments, the insulator material may have a porosity (% of water absorption at room temperature) of zero. In various embodiments, the dielectric strength the insulator material is greater than 26.6 kV/mm, the volume resistivity at room temperature is greater than $10^{14}$ Ohm-cm and greater than $10^{11}$ at 570° F., and the dielectric constant at room temperature and 8500 MHz is between about 9 where about in this context is ±5. In various embodiments, the insulator material may be a composition comprising between 40% and 70% by weight of epoxy resin comprising bisphenol AF diglycidyl ether having fluorinated methyl groups (DIAGRAM 1 below), between 10% and 30% by weight of silica glass, between 10% and 30% by weight brominated aliphatic polyol polyepoxy resin, between 1% and 5% antimony trioxide, and less than 0.1% by weight dye.

DIAGRAM 1

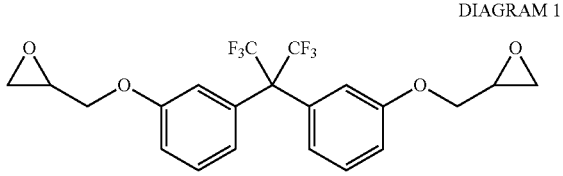 [SMILES: FC(F)(F)C(c1cccc(OCC2CO2)c1)(c1cccc(OCC2CO2)c1)C(F)(F)F]

In various embodiments, each of the sensor element 306, guard annulus 308, and ground plane annulus 310 comprise with a conductor material comprising an electrically conductive and hydrophobic third resin, epoxy, and/or thermoset material. In various embodiments, the conductor material has a resistivity not more than $10^{-7}$ Ohm-m. The conductor material is in electronic communication with the triaxial lead 312. With reference again to FIGS. 3A through 4B, the conductive material may be disposed within a channel formed between the sidewall 404 and the first annular wall of outer insulator 506 forming ground plane annulus 310 and may be in electronic communication with the outer shield 342. In like regard, the conductive material fill the space between the outer insulator 506 and the inner insulator 508 thereby forming guard plane annulus 308 and be in electronic communication with driven guard 346. The conductive material may fill the annulus of inner insulator 508 thereby forming sensor element 306 and be in electronic communication with lead wire 348. In various embodiments, the insulator material and the conductor material may be selectively laid down cured and machined within cavity 400 in alternating layers to form sensor puck 500. In various embodiments, sensor puck 500 may be performed and coupled to triaxial lead 312 and inserted into cavity 400. Cap 314 comprising the insulator material may be laid over the sensor face 505 of sensor puck 500 and cured tending thereby to protect the sensor face 505 and retain the sensor puck 500 within the cavity 400.

In various embodiments, the conductive material may comprise at least one of a third resin, epoxy, and/or thermoset material and may be hydrophobic and have conductive properties. In various embodiments, the conductive material may have mechanical properties such as, for example, strength, viscosity, thermal endurance, hardness, abrasion resistance, and density, substantially similar to body material 414. In various embodiments, the conductive material may have a porosity (% of water absorption at room temperature) of zero. In various embodiments, the conductive material may be a composition comprising between 40% and 70% by weight of epoxy resin comprising bisphenol AF diglycidyl ether having fluorinated methyl groups (DIAGRAM 1 above), between 0% and 30% by weight of silica glass, between 10% and 30% by weight of carbon black and/or silver powder, between 10% and 30% by weight brominated aliphatic polyol polyepoxy resin, between 1% and 5% antimony trioxide, and less than 0.1% by weight dye.

In various embodiments, the materials comprising a triaxial epoxy cap probe, such as body material 414, the insulator material, and the conductive material, may be cured under pressure or vacuum or heat treated to activate the adhesive property of the material, such as, for example by curing in an autoclave. In various embodiments, a triaxial epoxy cap probe may be cured simultaneously with a rub strip such as, for example, rub strip 214. In various embodiments a triaxial epoxy cap probe may be cured independently and bonded to the rub strip. In various embodiments, the materials may be partially cured in sequence then be fully cured integrating the materials, such as, for example, body material 414, insulator material, and the conductive material, as a monolithic or contiguous solid material embedding a triaxial lead therein. In various embodiments, a cap, such as cap 314, may be machined to an aerodynamic surface, such as inner aerodynamic surface 216, once fully cured.

Figure 6:
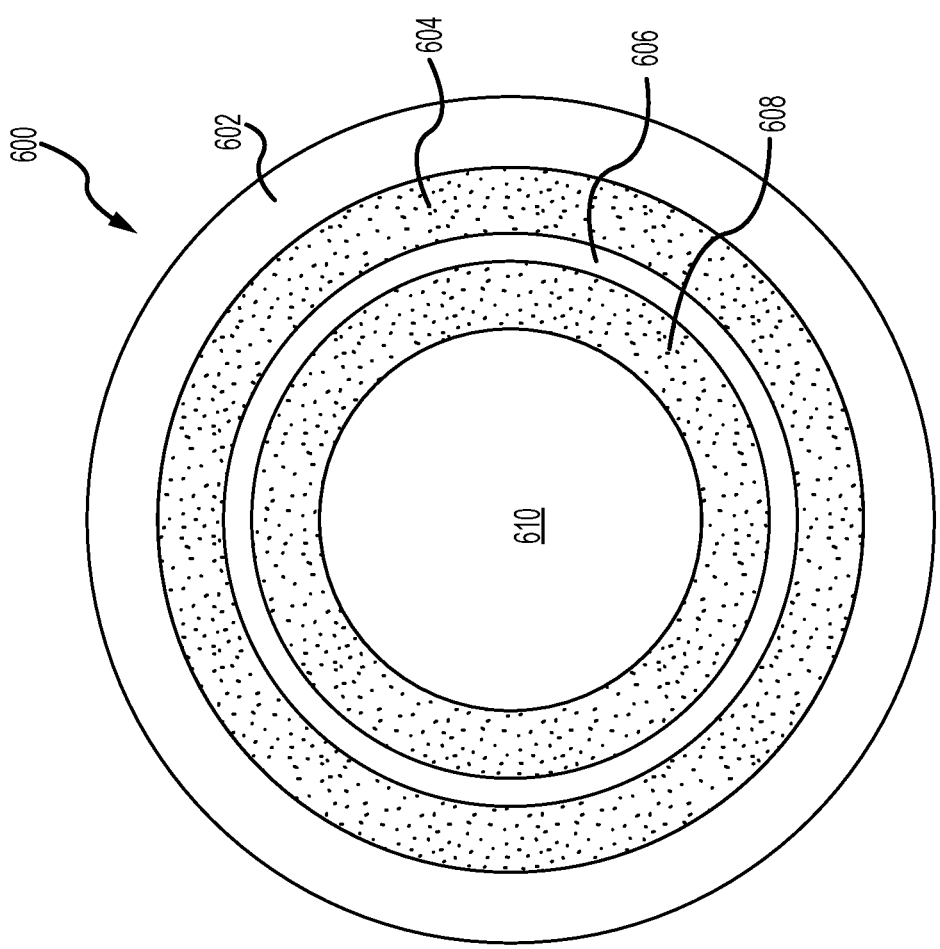
FIG. 6 illustrates a sensor face of a sensor puck, in accordance with various embodiments.

With additional reference to FIG. 6, an alternative sensor face 600 geometry is illustrated in accordance with various embodiments. Sensor face 600 may be constructed to reduce shunt capacitance by increasing the relative distance between each of the sensor element 610, guard plane annulus 606, and ground plane annulus 602. In this regard, the guard plane annulus 606 may be relatively thin whereas the outer insulator 604 and the inner insulator 608 may be relatively thick in comparison to the guard plane annulus 606. In various embodiments the overall diameter of sensor face 600 may be between 0.8 inches [20.32 mm] and 1 inch [25.4 mm]. The outer insulator 604 and the inner insulator 608 may be between 0.055 inches [1.397 mm] and 0.065 inches [1.651 mm] in radial width relative to the overall diameter. The guard plane annulus 606 may be between 0.025 inches [0.635 mm] and 0.035 inches [0.889 mm] in radial width relative to the overall diameter. The sensor element 610 may be between 0.31 inches [7.874 mm] and 0.41 inches [10.414 mm] in diameter.

Figure 7:
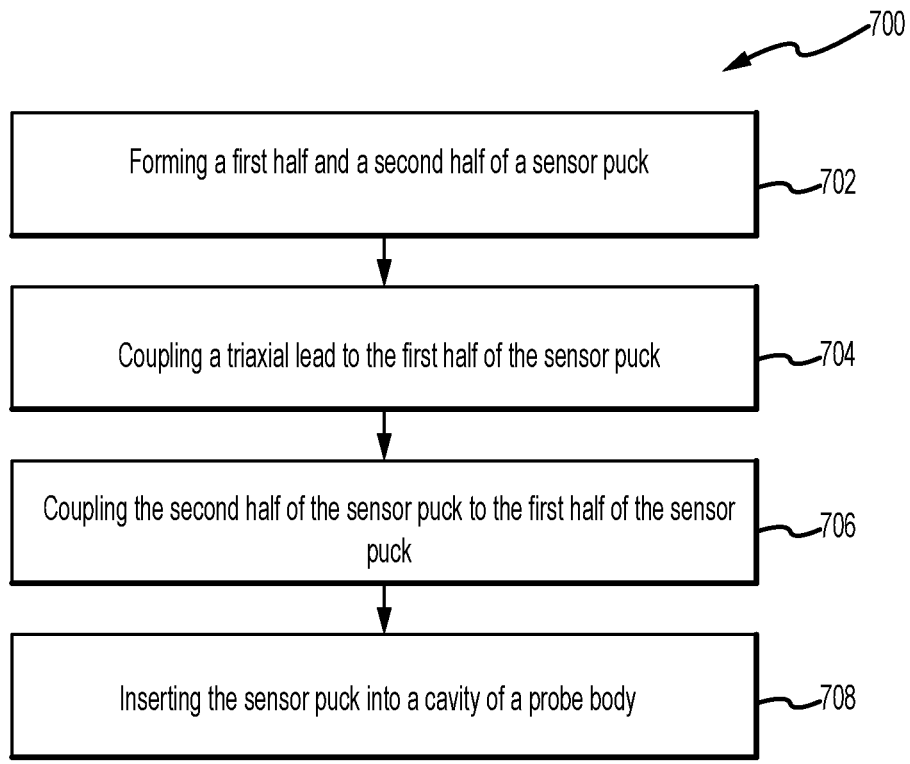
FIG. 7 illustrates a method of manufacturing a triaxial epoxy cap probe, in accordance with various embodiments.

In various embodiments and with reference now to FIG. 7, a method 700 of manufacturing a triaxial epoxy cap probe may comprise forming a first half and a second half of a sensor puck (step 702). Step 702 may include machining a first layer of insulator material to form first backplane 504 having a first annular wall of outer insulator 506. In various embodiments, machining may include additive manufacturing operations, subtractive manufacturing operations, and molding, such as, for example injection molding, casting, compression molding, and/or the like. Step 702 may include laying a second layer of conductive material over the backplane to form ground plane annulus 310. Step 702 may include machining an area within the first annular wall to form the guard annulus 308. Step 702 may include laying a third layer of insulator material within the ground plane annulus 310 and machining the third layer of insulator material to form the second backplane 507 and second annular wall of inner insulator 508. Step 702 may include laying a fourth layer of conductive material within the second annular wall to form the sensor element 306.

Method 700 further comprises coupling a triaxial lead to the first half of the sensor puck (step 704). Step 704 may include machining the first cutout 512 into the first mating surface 520 of the first half 502 of sensor puck 500. Step 704 may include inserting outer shield 342 into first channel 514, inserting driven guard 346 into second channel 516, and inserting lead wire 348 into third channel 518. Step 704 may include applying the conductive material within the first cutout 512 and bonding the outer shield 342 to the ground plane annulus 310, the driven guard 346 to the guard annulus 308, and the lead wire 348 to the sensor element 306.

Method 700 further comprises coupling a second half of the sensor puck to the first half (step 706). Step 706 may include machining a plurality of V-shaped grooves 510 into the first mating surface 520 of the first half 502. Step 706 may include aligning a plurality of V-shaped teeth of the second half 503 with the plurality of V-shaped grooves 510 of the first half 502 and inserting the plurality of V-shaped teeth into the plurality of V-shaped grooves 510. In various embodiments, step 706 may include masking the first annular wall and the second annular wall at the first mating surface 520, and coupling a first ring of conductor material to the ground plane annulus 310, a second ring of conductor material to the guard annulus 308, and a disk of conductor material to the sensor element 306. Step 706 may include removing the masking and laying a fifth layer of insulator material over the first ring, the second, ring, and the disk. Step 706 may include machining the fifth layer of insulator material to form sensor face 505 of sensor puck 500.

Method 700 includes inserting the sensor puck into a cavity of a probe body (step 708). Step 708 may include inserting sensor puck 500 into cavity 400 and triaxial lead 312 into passage 408. Step 708 may include filling a remainder of cavity 400 with the insulator material to form cap 314. Step 708 may include inserting the probe body 302 into rub strip 214 and machining cap 314 substantially flush with inner aerodynamic surface 216.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A triaxial epoxy cap probe, comprising:
   a probe body having a cavity disposed radially outward of a fan blade and comprising a first material;
   an outer insulator and an inner insulator disposed within the cavity, at least one of the outer insulator and the inner insulator comprising a second material;
   a sensor element disposed at least partially within the inner insulator;
   a guard annulus disposed about the sensor element and between the inner insulator and the outer insulator;
   a ground plane annulus disposed about the outer insulator, at least one of the sensor element, the guard annulus, and the ground plane annulus comprising a third material; and
   a triaxial lead in electronic communication with the sensor element, the guard annulus, and the ground plane annulus,
   wherein
   the second material includes at least one of a resin, epoxy, or thermoset material, and
   the third material includes at least one of a resin, epoxy, or thermoset material.

2. The triaxial epoxy cap probe of claim 1, wherein the first material comprises at least one of a composite, a resin, epoxy, or thermoset material.

3. The triaxial epoxy cap probe of claim 2, wherein the second material comprises at least one of a hydrophobic dielectric resin, epoxy, or thermoset material comprising bisphenol AF diglycidyl ether having fluorinated methyl groups.

4. The triaxial epoxy cap probe of claim 3, wherein the third material comprises at least one of a hydrophobic conductive resin, epoxy, or thermoset material comprising bisphenol AF diglycidyl ether having fluorinated methyl groups.

5. The triaxial epoxy cap probe of claim 4, wherein the probe body comprises a passage wherein the triaxial lead is disposed within the passage.

6. The triaxial epoxy cap probe of claim 5, wherein the sensor element, the inner insulator, the guard annulus, the outer insulator, and the ground plane annulus comprise a sensor puck.

7. The triaxial epoxy cap probe of claim 6, wherein the sensor puck comprises a first half, wherein the first half comprises, a first backplane, a second backplane, and a first mating surface.

8. The triaxial epoxy cap probe of claim 7, wherein the first backplane comprises a first annular wall and the second backplane comprises a second annular wall.

9. The triaxial epoxy cap probe of claim 8, wherein the sensor puck comprises a second half coupled to the first half at the first mating surface, wherein the first mating surface comprises a plurality of V-shaped grooves.

10. The triaxial epoxy cap probe of claim 9, further comprising a cap of the second material disposed within the cavity over the sensor puck.

11. A gas turbine engine comprising:
    a fan having a blade having a tip;
    a fan case having an inner aerodynamic surface and a rub strip;
    the tip proximate the inner aerodynamic surface; and a triaxial epoxy cap probe, comprising:
a probe body having a cavity disposed radially outward of a fan blade and comprising a first material;
an outer insulator and an inner insulator disposed within the cavity, at least one of the outer insulator and the inner insulator comprising a second material;
a sensor element disposed at least partially within the inner insulator;
a guard annulus disposed about the sensor element and between the inner insulator and the outer insulator;
a ground plane annulus disposed about the outer insulator, at least one of the sensor element, the guard annulus, and the ground plane annulus comprising a third material; and
a triaxial lead in electronic communication with the sensor element, the guard annulus, and the ground plane annulus,
wherein
the second material includes at least one of a resin, epoxy, or thermoset material, and
the third material includes at least one of a resin, epoxy, or thermoset material.

12. The gas turbine engine of claim 11, wherein the first material comprises at least one of a composite, a resin, epoxy, or thermoset material, the second material comprises at least one of a hydrophobic dielectric resin, epoxy, or thermoset material comprising bisphenol AF diglycidyl ether having fluorinated methyl groups, and the third material comprises at least one of a hydrophobic conductive resin, epoxy, or thermoset material comprising bisphenol AF diglycidyl ether having fluorinated methyl groups.

13. The gas turbine engine of claim 12, wherein the probe body comprises a passage wherein the triaxial lead is disposed within the passage.

14. The gas turbine engine of claim 13, wherein the sensor element, the inner insulator, the guard annulus, the outer insulator, and the ground plane annulus comprise a sensor puck.

15. The gas turbine engine of claim 14, wherein the sensor puck comprises a first half, wherein the first half comprises, a first backplane, a second backplane, and a first mating surface.

16. The gas turbine engine of claim 15, wherein the first backplane comprises a first annular wall and the second backplane comprises a second annular wall.

17. The gas turbine engine of claim 16, wherein the sensor puck comprises a second half coupled to the first half at the first mating surface, wherein the first mating surface comprises a plurality of V-shaped grooves.

18. The gas turbine engine of claim 17, further comprising a cap of the second material disposed within the cavity over the sensor puck.

19. The gas turbine engine of claim 18, wherein the first material, the second material, and the third material comprise a monolithic structure.

20. A method of manufacturing a triaxial epoxy cap probe, the method comprising:
forming a first half and a second half of a sensor puck;
coupling a triaxial lead to the first half of the sensor puck, wherein a lead wire is in electronic communication with a sensor element, a driven guard is in electronic communication with a guard annulus, and an outer shield is in electronic communication with a ground plane annulus;
coupling the second half of the sensor puck to the first half of the sensor puck;
inserting the sensor puck into a cavity of a probe body; and
filling a remainder of the cavity with an insulator material.

* * * * *